United States Patent

Dessailly

[15] 3,689,882
[45] Sept. 5, 1972

[54] ANTI-CRASH RADIO DETECTOR FOR AUTOMOTIVE VEHICLES

[72] Inventor: Rene Dessailly, Montrouge, France

[73] Assignee: T.E.M.I. Techniques Modernes Internationales, Montrouge, France

[22] Filed: Dec. 29, 1970

[21] Appl. No.: 102,427

[30] Foreign Application Priority Data

Dec. 29, 1969 France.....................6945241

[52] U.S. Cl. .....................340/53, 340/31, 340/258, 180/98
[51] Int. Cl. ..............................................G08g 1/00
[58] Field of Search..........340/22, 23, 26, 29, 31, 32, 340/33, 34, 53, 61, 258, 282; 180/98

[56] References Cited

UNITED STATES PATENTS 3,442,347  5/1969  Hodgson et al..............180/98
3,448,822  6/1969  La Lone et al...........340/31 X

*Primary Examiner*—Alvin H. Waring
*Attorney*—Holman & Stern

[57] ABSTRACT

Anti-crash radio-detector system for automotive vehicles adapted to take due account of all traffic conditions and operate efficiently for preventing an accident when an obstacle is detected ahead.

This system is characterized in that it comprises a radio-electric or radar detector, a device for producing from the information delivered by said detector another information concerning the approach speed of the equipped vehicle, an electronic computer for determining a first safety distance and a second safety distance, a light and/or sound alarm device, and a device for controlling the braking system.

This detector system is applicable to road and rail vehicles.

6 Claims, 2 Drawing Figures

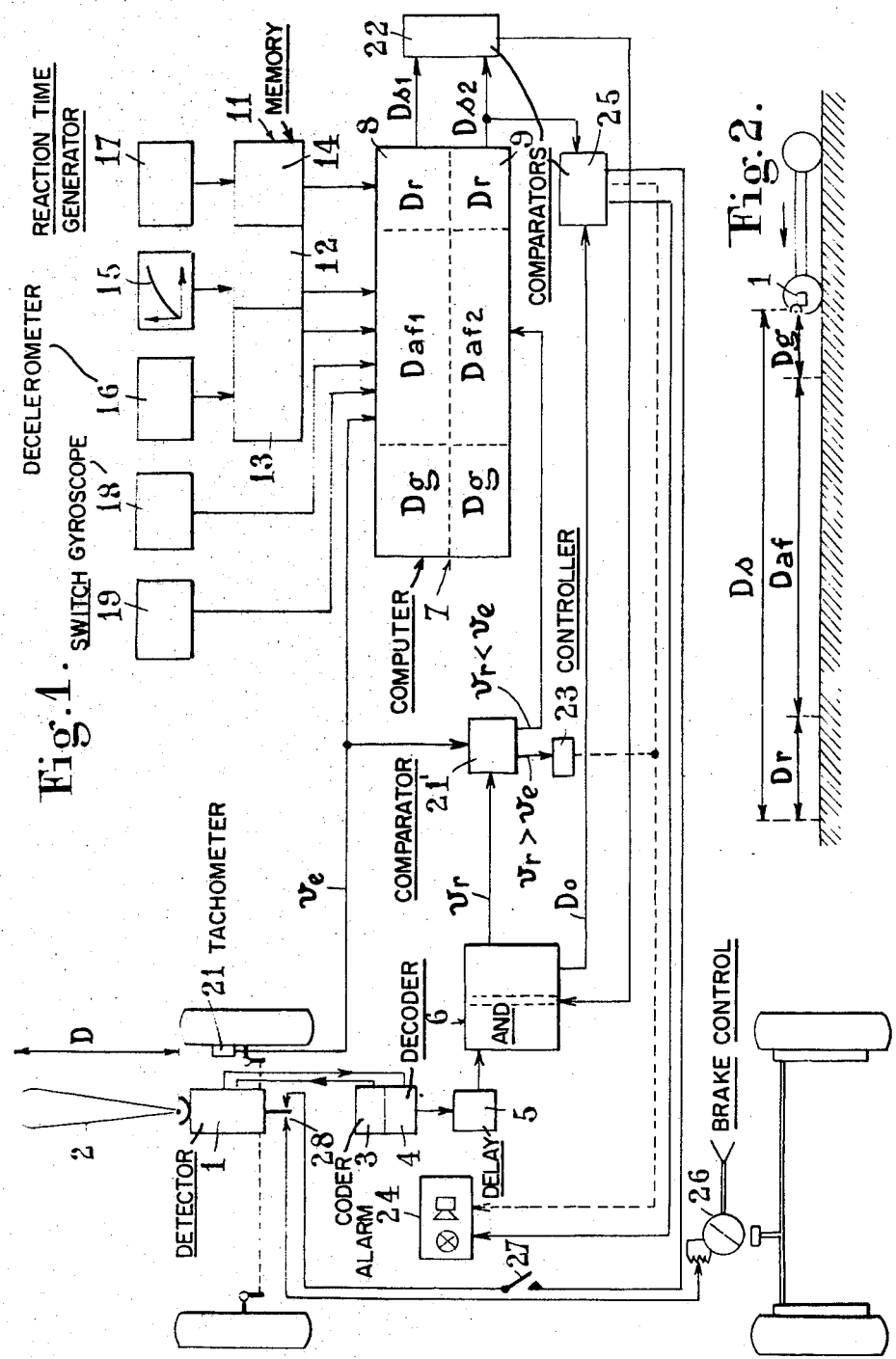

ANTI-CRASH RADIO DETECTOR FOR AUTOMOTIVE VEHICLES

BACKGROUND OF THE INVENTION

The present invention relates in general to radio detectors and has specific reference to an anti-crash radio detector for automotive vehicles.

It has already been contemplated to mount on automotive vehicles an equipment adapted to forestall the presence of a fixed or movable obstacle on the trajectory of a vehicle, at a predetermined distance ahead thereof, and to warn accordingly the driver of the vehicle of the likelihood of a danger.

SUMMARY OF THE INVENTION

Now the present invention relates more particularly to a radio detector of this character which is capable of taking due consideration of all momentary traffic conditions and to exert an efficient control action for preventing an accident when an obstacle is detected ahead.

To this end, the anti-crash radio detector for automotive vehicles according to this invention is characterized essentially in that it comprises a radio-electric or radar detector directing ahead of the vehicle radio-electric or Hertzian waves forming a beam of predetermined length and receiving the echoes produced by fixed or movable obstacles and receiving the echoes produced by fixed or movable obstacles appearing ahead of the vehicle, a device for producing from the information supplied by the radar another information related to the velocity of approach of the equipped vehicle with respect to a fixed or movable obstacle, a computer for determining as a function of various parameters concerning the vehicle and traffic conditions a first safety distance and, when the velocity of approach of the equipped vehicle is lower than or equal to the actual speed of the vehicle, a second safety distance, means for determining at any time the distance from the vehicle to the radar-detected fixed or movable obstacle, other means such as a comparison measurer for comparing the distance of the obstacle with the smallest of said first and second safety distances, a light and/or sound alarm device connected to the output of said comparison measurer in order to operate said alarm device immediately when the distance from the obstacle to the vehicle becomes inferior to the safety distance taken into account, and braking system control means also responsive to said comparison measurer.

With the radio-detector system according to this invention any possibility of crash between the vehicle equipped therewith and a fixed or movable obstacle present on or cutting in its path is safely avoided, regardless of road visibility conditions. This result is obtained by slowing down or if necessary stopping the vehicle equipped with this system before a fixed or movable obstacle present on its path or moving in the same direction, or cutting in this path.

This invention is applicable to all land vehicles, whether on road or on rails.

BRIEF DESCRIPTION OF THE DRAWINGS.

Now a typical form of embodiment of this invention will be described in detail with reference to the attached drawings, in which:

FIG. 1 is a block diagram of an anti-crash radio detector system according to this invention for equipping an automotive vehicle;

FIG. 2 is a diagram illustrating the various distances utilized in the system shown in FIG. 1.

DESCRIPTION OF THE PREFERRED EMBODIMENT.

The anti-crash radio-detector system illustrated diagrammatically in block form in FIG. 1 is mounted on an automotive vehicle and comprises at the front thereof a miniature radio-electric or radar detector proper 1 of the type utilizing a microwave generator or any other hertzian wave apparatus operating on suitable wavelengths or frequencies.

This miniature radar or detector 1 is adapted to transmit ahead of the vehicle a microwave or similar wave beam 2 having a bearing corresponding to a distance D.

This radio detector 1 has its input connected to the output of a coder 3 and its output connected to the input of a decoder 4. The radio-detector 1 is thus adapted to emit coded pulses and receives the echoes caused by the reflection of beam 2 of these pulses by an obstacle of any nature. The output of decoder 4 is fed to a delay-action device 5 in order to eliminate abnormally short echoes. This delay-action device, of any suitable and known type, has its output connected in turn to the input of a discriminator or AND circuit 6 to eliminate "ghost" and useless echoes, as well as those located at a distance beyond the shortest safety distance $D_s$ as will be explained presently.

The system according to this invention further comprises an electronic computer 7 having two stages 8 and 9.

This computer 7 receives data from a memory 11 comprising three sections 12, 13 and 14. Section 12 has recorded therein an information corresponding to a theoretical curve 15 giving for a given vehicle the value of the braking distance referred to hereinafter as the "-stop-brake" distance $D_{af}$ as a function of the actual speed $v_e$ of the vehicle. This theoretical curve 15 is calculated for each type of vehicle and integrated in section 12 of memory 11.

The average curve 15 giving the brake distance may be modified by various parameters such as the mass of the vehicle and its load, the surface area of tire adherence, the efficiency of the braking system, etc.. All these parameters corresponding to the deceleration which may easily be calculated by means of a decelerometer 16 connected to section 13 of memory 11. Thus, this decelerometer 16 will integrate in section 13 of memory 11 the various parameters concerning the deceleration of the vehicle involved.

Section 14 of memory 11 is connected to a generator 17 supplying an information corresponding to the average or self-tested reaction time of the driver (this time differing from one driver to another).

One input of computer 7 is also connected to a gyroscope 18 introducing into this computer an information corresponding to the momentary gradients of the roadway, in order to take due account thereof for determining the braking distance.

Similarly, a switch 19 adapted to be actuated by the driver enable him to bring the necessary correction in the computer on account of momentary road surface conditions such as rain, snow or other factors likely to modify the tire adherence.

Finally, another input of computer 7 is connected to a tachometric pick-up 21 delivering at its output a signal varying as a function of the momentary actual speed of the vehicle ($v_e$).

Under these conditions, the computer 7 will determine on the basis of these various input data a first braking distance $D_{af1}$ calculated at all times in the first stage 8 of computer 7. Furthermore, this computer 7 calculates in its first stage 8 a reaction distance $D_r$ from the information received from section 14 of memory 11. This distance reaction $D_r$ corresponds to the driver's reaction time at the momentary vehicle speed. Finally, the computer 7 will also determine the guard-distance $D_g$ corresponding to the minimum safety distance to be kept between two vehicles running in the same direction and at the same speed, or alternatively the distance between a fixed obstacle and the stopping point of the vehicle equipped with the system. This guard-distance $D_g$ corresponds to a predetermined percentage (for instance from 10 percent to 20 percent) of the braking distance $D_{af1}$ calculated from the actual vehicle speed $v_e$. A minimum distance may be introduced into the memory, or preset therein, and may correspond to the length of the vehicle concerned.

The approach speed $v_r$ and actual vehicle speed $v_e$ are compared with each other in a comparator 21' delivering a signal at one output if the approach speed $v_r$ is lower than the actual speed $v_e$ of the vehicle, this one output being connected to the aforesaid second stage 9. This comparator 21' has another output delivering a signal in case the approach speed $v_r$ were greater than the actual vehicle speed $v_e$.

If the approach speed $v_r$ is lower than the actual vehicle speed $v_e$ the second stage 9 will perform the same operations as stage 8 and thus calculate a second braking distance $D_{af2}$ from the approach speed $v_r$. The second stage 9 of computer 7 delivers an information corresponding to the second safety distance $D_{s2} = D_g + D_{af2} + D_r$.

The outputs of stages 8 and 9 are connected to a discriminating comparator 22 adapted to select the shortest safety distance $D_{s1}$ or $D_{s2}$, in order to limit the radar data to this value.

If the approach speed $v_r$ is greater than the actual vehicle speed $v_e$ (as in the case of an oncoming vehicle within the safety distance $D_s$) the comparator 21' will emit from its output a signal fed to a member 23 controlling the actuation or energization of a light and/or sound alarm device 24.

The radar discriminator 6 also transmits at one of its outputs a signal $D_o$ corresponding to the distance of the approaching obstacles. This signal is fed to one input of a comparator 25 receiving at its other input the signal $D_{s2}$ corresponding to the second safety distance. The output of comparator 25 is connected to the alarm device 24 in order to operate the latter intermittently when the distance from the approaching or oncoming obstacle giving the signal $D_o$ decreases until it is equal to and then lower than the second safety distance $D_{s2}$.

After a predetermined time period corresponding to the driver's reaction time, or in case the obstacle intercepts or cuts in laterally, the braking distance $D_{af}$, the comparator 25 will actuate the alarm device 24 continuously. Also in this case the brake control means 26 connected in series with an ON-OFF switch 27 and with another switch 28 closed only when the vehicle is running along a straight path, becomes operative if it is energized, i.e., if switch 27 is ON or closed, thus applying automatically the brakes of the vehicle when the latter is being driven on a straight road.

The "radar" transmission from generator 1 is adapted to spot up to a minimum distance of 500 m (1,640 ft) any obstacle having a minimum cross-sectional surface area determined by practical tests. Of course, the scanning surface should be restricted to a proper value.

When the computer 7 has determined the first safety distance $D_{s1}$ or "initial" distance based on the momentary speed of the vehicle ($v_e$) it limits the "radar" information to this distance. When an echo is received, the radar measures the approach speed $v_r$ and feeds a corresponding signal to computer 7. If this speed $v_r$ is equal to or greater than the vehicle speed $v_e$, the computer will determine the second "useful" safety distance $D_{s2}$.

If the approach speed $v_r$ is equal to the vehicle speed $v_e$ the "initial" safety distance $D_{s1}$ and the second "useful" safety distance $D_{s2}$ are identical. The alarm device 24 is energized when the approach distance $D_o$ corresponds to the safety distance $D_{s1} = D_{s2}$.

If on the other hand the approach speed $v_r$ is lower than the vehicle speed $v_e$ the computer having determined the new safety distance $D_{s2}$ limits the "radar" information to this specific distance.

As already mentioned in the foregoing, the driver utilizing the anti-crash system of this invention must add certain parameters (rain, snow, reaction time) to the memory 11 of computer 7. He may test (before starting off) the proper operation of the light and/or sound alarm device 24 when the system is in its operative condition. He may also put the brake control means 26 in its operative or inoperative position.

This last-named device 26 is not necessary for town driving, the alarm device being sufficient for warning the driver.

On the open road, when the radar receives an echo at the safety distance the computer "registers" this echo after a very short time lag.

Then, two cases may arise :

a. The obstacle is fixed (approach speed $v_r$ = vehicle speed $v_e$).

In this case the alarm device will be energized at the safety distance $D_{s1}$.

If the driver reacts normally and causes the vehicle to slow down gradually, the braking distance $D_{af1}$ and guard distance $D_g$ remain still lower than the safety distance $D_{s1}$ and the alarm signals will remain intermittent until the vehicle is at a standstill at said guard distance $D_g$. These signals will cease when the obstacle disappears from the path ahead of the vehicle, or if the deceleration restores the safety distance to a value lower than the distance measured between the vehicle and the obstacle.

If the driver does not react and the brake control device 26 is switched on, this device 26 will become gradually operative until the vehicle is stopped at the same guard distance, unless the vehicle is not driven along a straight road.

In this last case, or if the brake control device is disconnected or inoperative, the alarm signals will become continuous and of greater intensity.

b. The obstacle is movable (approach speed $v_r$ other than the actual speed $v_e$ of the vehicle).

The computer 7 determines a new safety distance Ds2.

We have seen that this computer 7 is insensitive or not responsive to "away" speeds (as in the case of another vehicle overtaking the vehicle equipped with the system of this invention). The approach speeds $v_r$ greater than the vehicle speed $v_e$ (as in the case of an oncoming vehicle driven at a speed beyond the limits of the safety range), are calculated but they are effective only in the alarm device 24.

When the equipped vehicle is about to rejoin a slower vehicle following the same path ahead the approach speed $v_r$ lower than the actual speed provides a new safety distance $D_{s2}$ based on the braking distance $D_{af2}$ at the approach speed $v_2$.

The guard-distance $D_g$ remains unchanged if the equipped vehicle remains at the same speed and the reaction distance $D_r$ is also unchanged.

The alarm device 24 is energized when the safety distance corresponds to the actual distance between the two vehicles.

The deceleration controlled by the driver at the limit of the intermittent signal operation will reduce the speed of the equipped vehicle to the same value as that of the vehicle preceding it.

The distance between the vehicles is equal to the guard distance plus the reaction distance.

When the equipped vehicle overtakes another vehicle, the necessary change of direction is attended firstly by the elimination of the brake application. Since a new, free path is now followed by the vehicle, the alarm device 24 is de-energized.

During the overtaking, the radar may receive an echo from another, oncoming vehicle crossing during a short time period the safety zone. If this echo is only transient, the computer 7 will disregard it; if it becomes persistent the alarm device 24 will warn the driver of a possible danger. This delay action permits of eliminating short "blinks" of the alarm device 24 on transitory echoes.

If a plurality of echoes are received, the computer 7 will be responsive only to the nearest one.

Now the mode of operation of the system when negotiating a curve will be explained in detail.

The antenna of radar 1 is pivotally mounted and operatively connected to the steering mechanism so as to move through the same angle as the steering road wheels. Any 2° movement right or left will eliminate the brake control system 26 as a consequence of the opening of the corresponding contact 28. If the curve ahead of the vehicle requires a steering angle of lesser value the system will operate as in the case of straight roads or paths.

If the radius of the curve ahead is shorter, only the alarm device is operated in case of an obstacle located at a distance shorter than that set in the case of a straight road.

If a very sharp turn lies ahead, the alarm device may be energized directly to emit continuous warning signals. However, the speed is compulsorily normally reduced by the drive before the curve.

In case of a right-angle turn or an intersection lined by a wall of any screen in front of the path followed by the vehicle, the system operates as in the presence of a fixed obstacle and reverts to its inoperative condition when the driver turns the steering wheel for negotiating the turn.

Now the case of a lateral interception of the safety zone (i.e., in case of a vehicle cutting in front of the equipped vehicle or penetrating laterally into the protected zone) will be described in detail.

Considering again the preceding explanations, if the obstacle intercepts the safety zone in the portion thereof remotest from the vehicle, which is designated by the symbol $D_r$, the alarm device will operate intermittently but one fraction of the reaction time is eliminated.

If the interception takes place at a distance shorter than the braking distance $D_{af}$, the alarm device produces a continuous signal.

On a straight road, the brake control device 26 operates immediately and as efficiently as necessary for preserving the maximum guard distance $D_g$.

If the intercepting or cutting-in vehicle or obstacle appears at a distance inferior to the braking distance $D_{af}$, the braking action is maximum and immediate as long as the obstacle is present on the path ahead of the vehicle. This action is prompter than the driver's action and will minimize any possible damages in case of accident.

It will readily occur to those conversant with the art that the specific form of embodiment of the invention which is described and illustrated herein is given by way of example only and should not be construed as limiting the scope of the invention since many modifications and variations may be brought in the practical actuation of this invention, within the limits of the appended claims.

What I claim is:

1. An anti-crash radio detector system for automotive vehicle, which comprises a radio-electric or radar detector projecting ahead of the vehicle a radio-electric wave beam of predetermined wave length and receiving the echoes reflected by fixed or movable obstacles appearing in front of the vehicle, a device for producing from the information delivered by said radar another information relative to the velocity of approach of the vehicle equipped with this detector in relation to a fixed or movable obstacle, an electronic computer for determining as a function of the various parameters inherent to the vehicle and to traffic conditions a first safety distance and, when the approach velocity of the vehicle is lower than or equal to the actual vehicle speed, determining a second safety distance, means for discriminating echoes reflected by obstacles being at a distance from said vehicle, shorter than the smallest of said first and second safety distances, means for determining at any time the distance between a fixed or movable obstacle detected by said radar and the vehicle equipped therewith, means for comparing the distance of said obstacle with said second safety distance, an alarm device connected to the output of said comparison means in order to operate said alarm device when the distance of said obstacle becomes shorter than the second safety distance, and a device for actuating the braking system which is also responsive to said comparison means.

2. An anti-crash radio detector system for automotive vehicle as set forth in claim 1, wherein said electronic computer receives at its inputs a first signal corresponding to the actual speed of the vehicle, said first signal being transmitted from a tachometric pick-up device, a second signal delivered from a switch adapted to be actuated by the driver of the equipped vehicle and corresponding to the road surface condition, a third signal emitted from a gyroscope and corresponding to an information related to the road gradient, and fourth, fifth, and sixth signals from three sections of a memory which are adapted to record an information corresponding to a theoretical curve giving the value of the braking distance as a function of the actual speed of the vehicle, an information delivered by a decelerometer and corresponding to the deceleration, and an information delivered by a generator and corresponding to the average or self-tested reaction time of the driver, respectively, said electronic computer comprising two stages of which the first one delivers the sum of a guard distance, of a first braking distance calculated from the value of the actual or momentary speed of the equipped vehicle, and a reaction distance for giving the aforesaid first safety distance and emit a first output signal corresponding to this first safety distance, the second stage of said computer determining the second safety distance by summing the guard distance, a second braking distance calculated from the value of the approach speed and the reaction distance in order to deliver to another output a second signal corresponding in value to the second safety distance.

3. An anti-crash radio-detector system as set forth in claim 2, wherein the input and output of said radar are connected to the output of a coder and to the input of a decoder, respectively, said decoder being connected through a delay-action device to the input of an AND gate delivering at one of its outputs a signal corresponding to the approach distance and at its other output a signal corresponding to the distance of the obstacle, and wherein a first comparator has two inputs receiving the one the signal corresponding to the actual speed of the vehicle and the other the signal corresponding to the approach speed, said first comparator comprising a first output delivering a signal when the approach speed is lower than the actual vehicle speed and to said computer for controlling the operation of the second stage thereof, and a second output delivering a signal when the approach speed is greater than the actual vehicle speed, said second output being connected to a member adapted to operate said alarm device intermittently.

4. An anti-crash radio-detector system as set forth in claim 3, wherein said second output of said AND gate which delivers a signal corresponding to the distance of the obstacle is connected to one input of a second comparator receiving at another input the signal corresponding to the second safety distance, said comparator comprising a first output connected to said alarm device so as to cause said alarm device to operate intermittently in case the distance of said obstacle were shorter than the second safety distance, a second output also connected to said alarm device and delivering a signal after a predetermined time period corresponding to the driver's reaction time for operating said alarm device continuously, and a third output connected through an ON-OFF switch to the braking system control device.

5. An anti-crash radio-detector system as set forth in claim 4, wherein a switch is inserted in the electric circuit controlling the braking system control device, said switch being closed when the vehicle is driven along a straight path and open when the front steering wheels are steered through a small predetermined angle.

6. An anti-crash radio-detector system as set forth in claim 4, wherein the outputs of the two stages which deliver respectively the signal corresponding to the first safety distance and the signal corresponding to the second safety distance are connected to the inputs of a discriminating comparator having its output connected to said AND-gate in order to select the shortest safety distance of the two and thus limit the radar information to this value.

* * * * *